(12) United States Patent
Petzl et al.

(10) Patent No.: US 8,322,003 B2
(45) Date of Patent: Dec. 4, 2012

(54) ATTACHMENT SHACKLE WITH LOCKABLE ROTATING FERRULE

(75) Inventors: Paul Petzl, Barraux (FR); Jean-Marc Hede, Domene (FR)

(73) Assignee: Zedel, Crolles (FR)

( * ) Notice: Subject to any disclaimer, the term of this patent is extended or adjusted under 35 U.S.C. 154(b) by 255 days.

(21) Appl. No.: 12/725,158

(22) Filed: Mar. 16, 2010

(65) Prior Publication Data
US 2010/0269314 A1 Oct. 28, 2010

(30) Foreign Application Priority Data

Apr. 22, 2009 (FR) ...................................... 09 01948

(51) Int. Cl.
*F16G 15/04* (2006.01)
*F16B 45/00* (2006.01)

(52) U.S. Cl. ............................ 24/598.8; 24/598.2; 59/86

(58) Field of Classification Search .................. 24/598.8, 24/598.3, 598.2; 59/85, 86; 362/457; 70/459
See application file for complete search history.

(56) References Cited

U.S. PATENT DOCUMENTS

| | | | | | |
|---|---|---|---|---|---|
| 195,940 | A | * | 10/1877 | Martin | 59/85 |
| 520,110 | A | * | 5/1894 | Hull | 278/96 |
| 1,044,792 | A | * | 11/1912 | Levy | 43/17.2 |
| 2,010,853 | A | * | 8/1935 | Dyer | 59/86 |
| 2,097,465 | A | * | 11/1937 | Morrison | 59/86 |
| 4,068,960 | A | * | 1/1978 | Swager | 403/20 |
| 4,914,903 | A | * | 4/1990 | Bernt et al. | 59/86 |
| 5,114,260 | A | * | 5/1992 | Hart et al. | 403/24 |
| 5,433,547 | A | * | 7/1995 | Hart et al. | 403/24 |
| 5,505,013 | A | | 4/1996 | Gois | |
| 5,791,025 | A | | 8/1998 | Maurice et al. | |
| 7,540,140 | B1 | * | 6/2009 | Diaz et al. | 59/86 |
| 7,900,430 | B1 | * | 3/2011 | McCauley | 59/86 |
| 2003/0209004 | A1 | | 11/2003 | Chang | |

FOREIGN PATENT DOCUMENTS

| | | |
|---|---|---|
| DE | 4 237 263 A1 | 7/1994 |
| EP | 0 376 860 A1 | 7/1990 |
| EP | 0 826 890 A1 | 3/1998 |
| GB | 2 077 838 A | 12/1981 |

* cited by examiner

*Primary Examiner* — Robert J Sandy
*Assistant Examiner* — Rowland D Do
(74) *Attorney, Agent, or Firm* — Oliff & Berridge, PLC

(57) ABSTRACT

An attachment shackle has an open ring having threaded first and second end-parts arranged facing one another at the opposite ends. A rotary ferrule of tubular shape is fitted with screwing on the second end-part to close or open the space separating the two end-parts. A lock is arranged at the rear of the first end-part. The lock engages in a notch of the ferrule to perform locking in the closed position. Unlocking is performed by a manual releasing action of the lock allowing movement of the rotary ferrule to the open position.

7 Claims, 6 Drawing Sheets

ATTACHMENT SHACKLE WITH LOCKABLE ROTATING FERRULE

BACKGROUND OF THE INVENTION

The invention relates to an attachment shackle comprising:
a body in the form of an open ring having threaded first and second end-parts arranged facing one another at the opposite ends,
and a tubular rotating ferrule fitted with screwing on the second end-part to close or open the space separating the two end-parts.

STATE OF THE ART

Two types of attachment devices exist using an open ring able to be closed by a mobile closing member. These two types are carabiners and fast-secure shackles. The first type concerns carabiners equipped with a pivoting gate biased to the closed position by a return spring. Fast-secure shackles of the second type (see document U.S. 2003/0209004) comprise a closing ferrule that is movable in translation by screwing either in the closing direction or in the opposite opening direction.

Known lockable carabiners are generally equipped with screw-on or bayonet ferrules fitted coaxially on the pivoting mobile gate (see document U.S. Pat. No. 5,505,013). In the case of screw-on ferrules, manipulating the device from the unlocked second position to the locked first position requires the ring to be screwed through several complete turns to move the latter in translation along the gate over a travel of a few millimeters so as to efficiently overlap on the securing member of the body. This screwing operation requires a relatively long handling time. The same drawback arises when unscrewing to make the ferrule go from the locked first position to the unlocked second position. In the case of a bayonet ferrule, blocking of the gate in the closed position is achieved by a first movement of the ferrule in upward translation against the force of a spring, followed by a second limited rotational movement. After it has been released, the ferrule is subjected to a slight kick-back movement and is secured in the locked first position by the elastic force of the spring. Nuisance unlocking of the ferrule does however remain possible in the presence of friction forces exerted by the rope.

The document EP 826890 describes a carabiner with a locking ferrule that is fitted rotating around the pivoting gate. A ball-lock is integrally attached to the gate and operates in conjunction with the rotary ferrule to perform positive locking of the carabiner in the closed position when the ferrule is actuated at the end of travel. Manual movement of the ferrule in rotation from the locked first position to the unlocked second position can only be achieved after the lock has been previously neutralized. Opening a carabiner gate therefore requires a first operation unlatching the lock, a second rotational movement of the ferrule to the unlocked second position, and a third pivoting movement of the gate to the open position. The second rotational movement to unlock the ferrule makes the opening sequence longer and complicates handling of the carabiner.

Carabiners also exist having an automatic locking ferrule that locks the gate when the latter reaches the closed position by the action of a return spring. The ferrule can be rotary or sliding and remains in the unlocked position so long as the gate is open. It automatically reverts to the locked position at the end of closing travel of the gate. When the ferrule is moved between the unlocked position and the locked position, it can be observed that the friction forces of the ferrule could hinder full closing of the gate, to the detriment of safety.

The documents DE 4237263 and GB 2077838 refer to carabiners each equipped with a latching lock controlled and driven directly by a spring to secure the gate in the closed position. According to the document DE 4237263, the lock is integrated inside the gate, and unlocking the latter to open the carabiner requires a great amount of force.

In fast-secure shackles of the second type, the screw-fastening ferrule has to be actuated in rotation throughout the translational travel when closing or opening are performed. To guarantee the strength of the shackle, the ferrule has to be tightly screwed to the hilt to prevent any possibility of slackening or breaking due to a strong stress force.

OBJECT OF THE INVENTION

The object of the invention consists in providing an attachment shackle of the second type having a great strength and providing the user with optimum safety.

The shackle according to the invention is characterized in that:
a lock is housed in a recess of the body at the rear of the first threaded end part, being biased to the locked position by a spring,
the peripheral end of the ferrule comprises a notch wherein the lock automatically engages at the end of screw-tightening travel, unlocking being performed by a manual releasing action of the lock enabling the rotary ferrule to be unscrewed to the open position.

Insertion of the lock in the notch of the ferrule indicates to the user that the shackle is positively locked in the closed position. Any unscrewing of the ferrule is impossible so long as the lock remains secured in the locked position.

According to a preferred embodiment, a base-part in the form of a wedge allows a pivoting movement of the lock to the unlocked position.

BRIEF DESCRIPTION OF THE DRAWINGS

Other advantages and features will become more clearly apparent from the following description of a particular embodiment of the invention given for non-restrictive example purposes only and represented in the appended drawings, in which.

DESCRIPTION OF A PARTICULAR EMBODIMENT

With reference to the figures, a fast-secure attachment shackle 10 comprises a body 11 in the form of an open ring made from a curved metal bar having a C-shaped elongate profile, the bar presenting a circular transverse cross-section.

Figure 1:
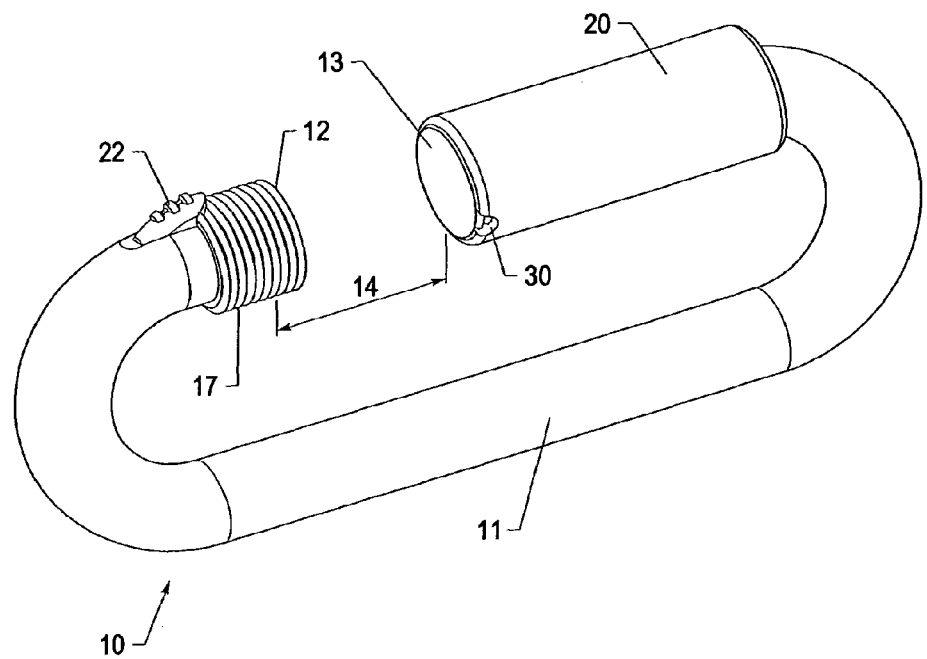
FIG. 1 is a schematic perspective view of the shackle according to the invention, the rotary ferrule being represented in the open position.
Figure 2:
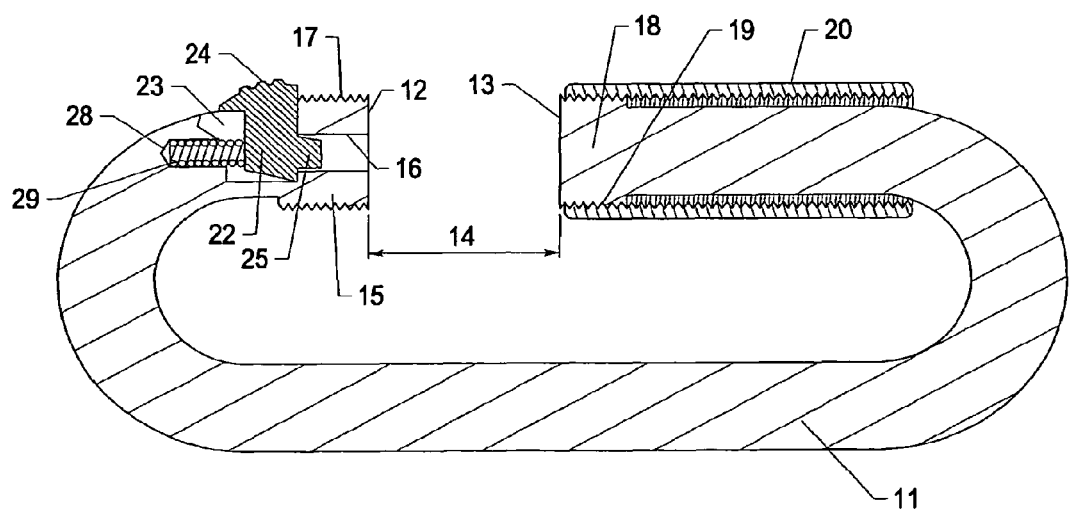
FIG. 2 shows a cross-sectional view of FIG. 1.

The two ends 12, 13 of body 11 are arranged facing one another, being separated by a longitudinal space 14 enabling a rope or a webbing strap to be inserted. In the case of FIGS. 1 and 2, space 14 is maximum and corresponds to the open position.

One of ends 12 is provided with a tubular first end-part 15 having a pass-through inside bore 16 of circular cross-section and a first thread 17 arranged along the outer lateral surface. The external diameter of first end-part 15 is slightly larger than that of the bar constituting body 11.

The other end 13 of body 11 comprises a second end-part 18 provided with an external second thread 19 identical to first thread 17. A tubular ferrule 20 is fitted rotating on second end-part 18 by means of an inner third thread 21 operating by screwing in conjunction with second thread 19. The length of ferrule 20 is calculated to close space 14 at the end of tightening travel during which third thread 21 is screwed onto first thread 17 of first end-part 17. Inner third thread 21 extends over the whole length of ferrule 20.

A lock 22 designed to lock ferrule 20 in the closed position is located at the rear of first end-part 15. Lock 22 is housed in a recess 23 of body 11 communicating with inner bore 16 of first end-part 15. Lock 22 is composed of an operating button 24, a salient pin 25 penetrating with clearance into bore 16, and a base part 26 in the form of a wedge resting on a rim 27 of first end-part 15. Operating button 24 can be colored.

A compression spring 28 is housed in a hole 29 of body 11 and acts on lock 22 to bias the latter to the locked position. Spring 28 is coaxially aligned with bore 16 and with pin 25. The latter remains held in bore 16 by the flexible action of spring 28 when the pivoting movement of lock 22 takes place to the unlocked position.

The peripheral end of ferrule 20 is provided with a notch 30 wherein lock 22 is inserted in the locked position at the end of screwing travel. The width of notch 30 is slightly larger than that of lock 22, and spring 28 renders this locking position stable.

Operation of attachment shackle 10 according to the invention is as follows:

In the open position of FIGS. 1 and 2, space 14 separating end 12 from is opposite end 13 and from mobile ferrule 20 is maximum. Lock 22 is pushed by spring 28 into a position wherein it is pressing in stable manner against first end-part 15.

Figure 3:
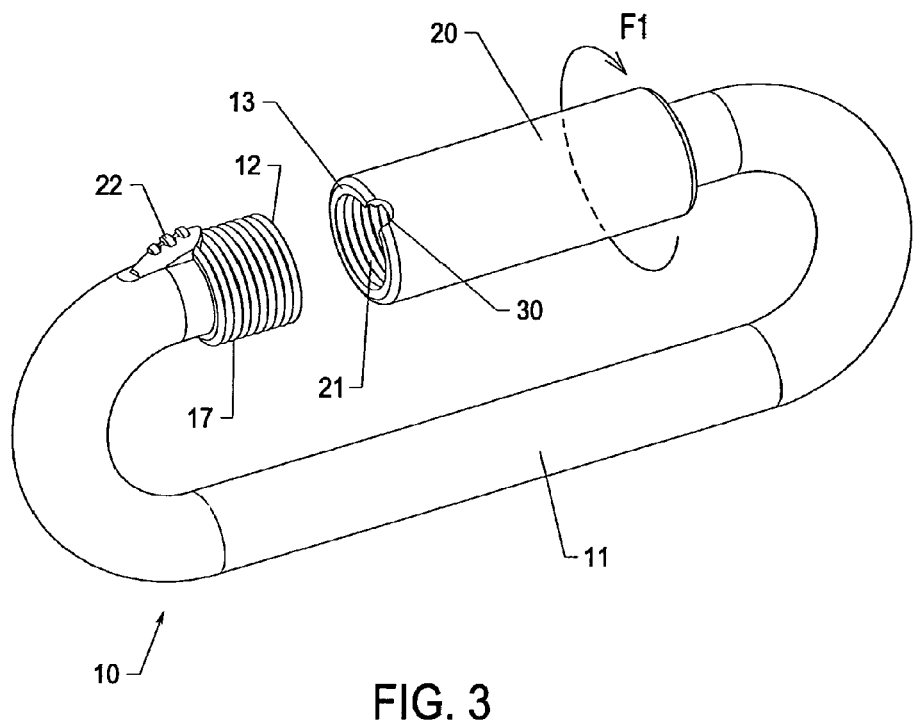
FIGS. 3 and 4 are identical views to FIGS. 1 and 2, during screw-tightening of the ferrule to the closed position.
Figure 4:
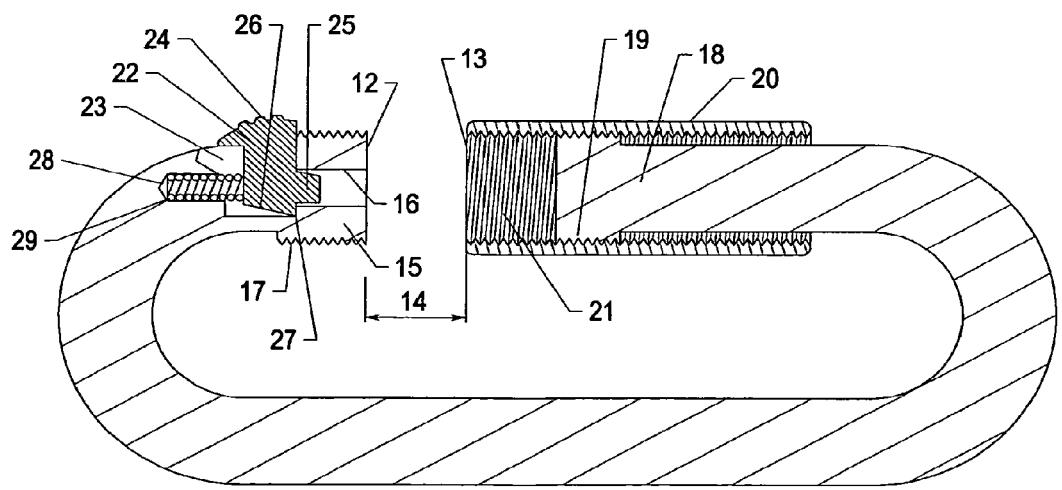

To close shackle 10, in particular after a rope or a strap has been inserted inside body 11, ferrule 20 simply has to be turned in the direction of arrow F (FIG. 3). Space 14 decreases as ferrule 20 moves closer to end 12 of body 11. Lock 22 remains immobile during rotation of ferrule 20 on second end-part 18 (FIG. 4).

Figure 5:
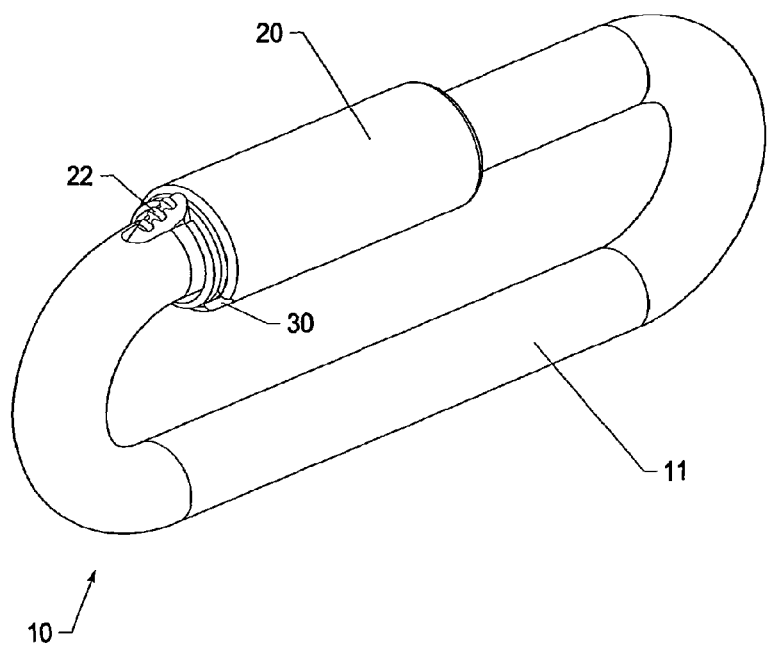
FIGS. 5 and 6 are identical views to FIGS. 3 and 4, when the ferrule comes into contact against the lock but before locking and before the spring is compressed.
Figure 6:
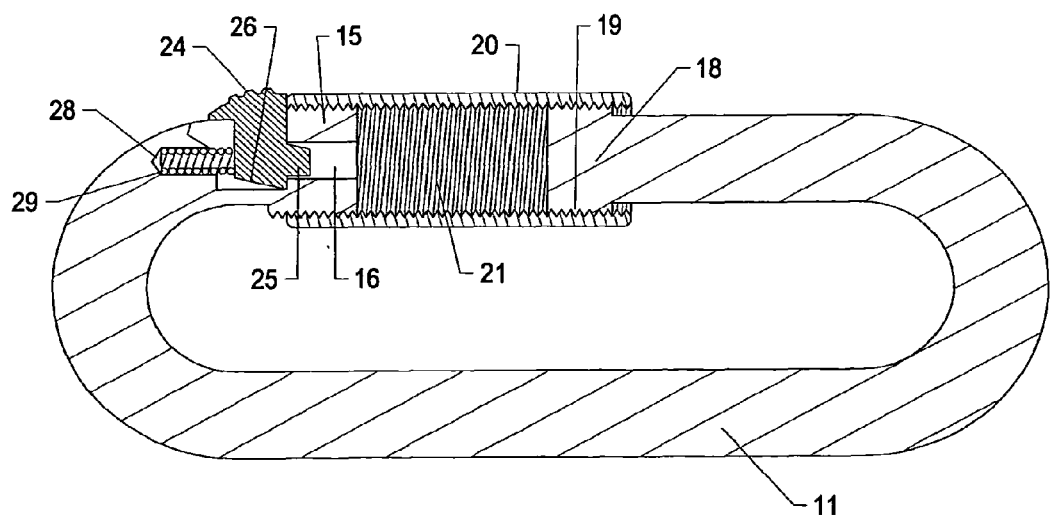

In the course of continued rotational movement of ferrule 20 represented in FIGS. 5 and 6, the front of ferrule 20 comes into contact with lock 22, but notch 30 of ferrule 20 remains angularly offset with respect thereto. Lock 22 still remains immobile in the position of FIG. 6.

Figure 7:
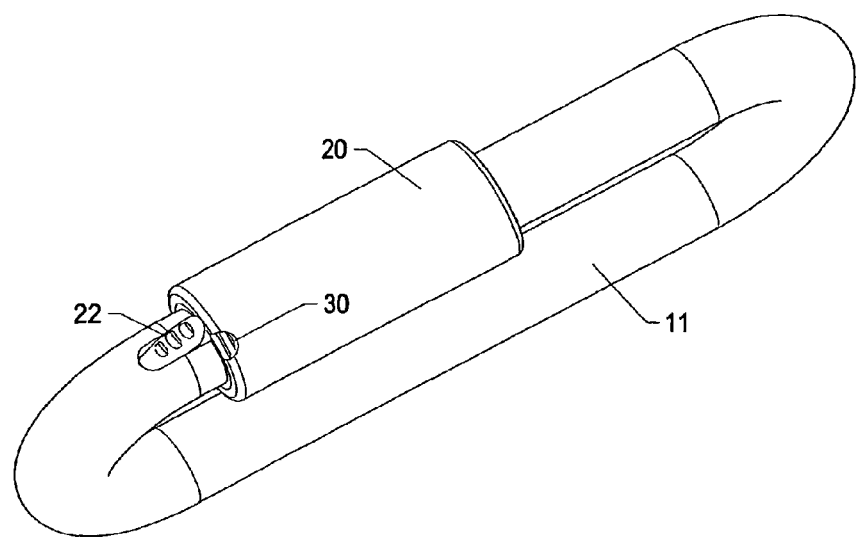
FIGS. 7 and 8 are identical views to FIGS. 5 and 6, when pivoting of the lock takes place after the spring has been compressed.
Figure 8:
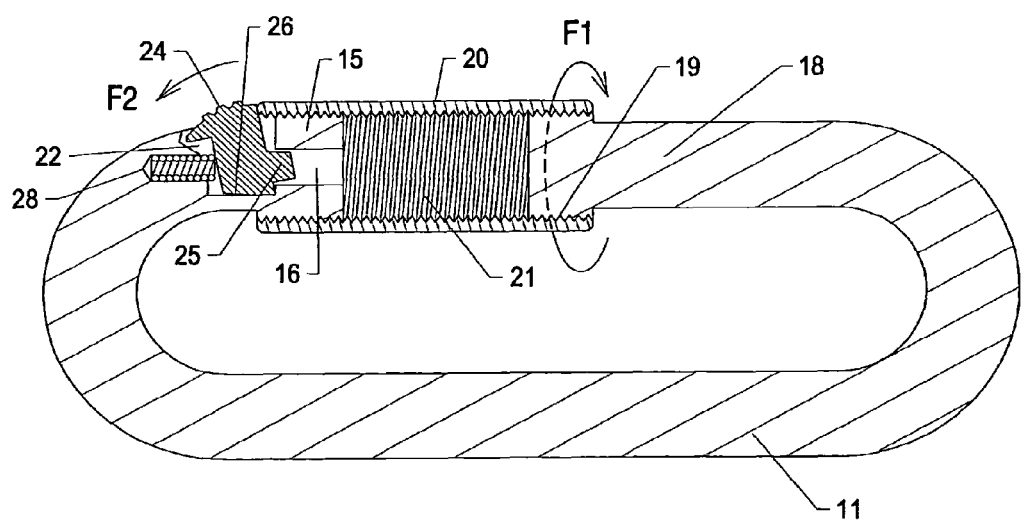

From the position of FIG. 6, continued rotation of ferrule 20 in the direction of arrow F1 causes a pivoting movement of lock 22 in the direction of arrow F2, against the elastic force of spring 28 (FIGS. 7 and 8). Notch 30 of ferrule 20 moves towards lock 22, but still remains angularly offset from the latter (FIG. 7). The pivoting travel of lock 22 depends on the angle of incline of wedge-shaped base part 26 with respect to the bottom of notch 23.

Figure 9:
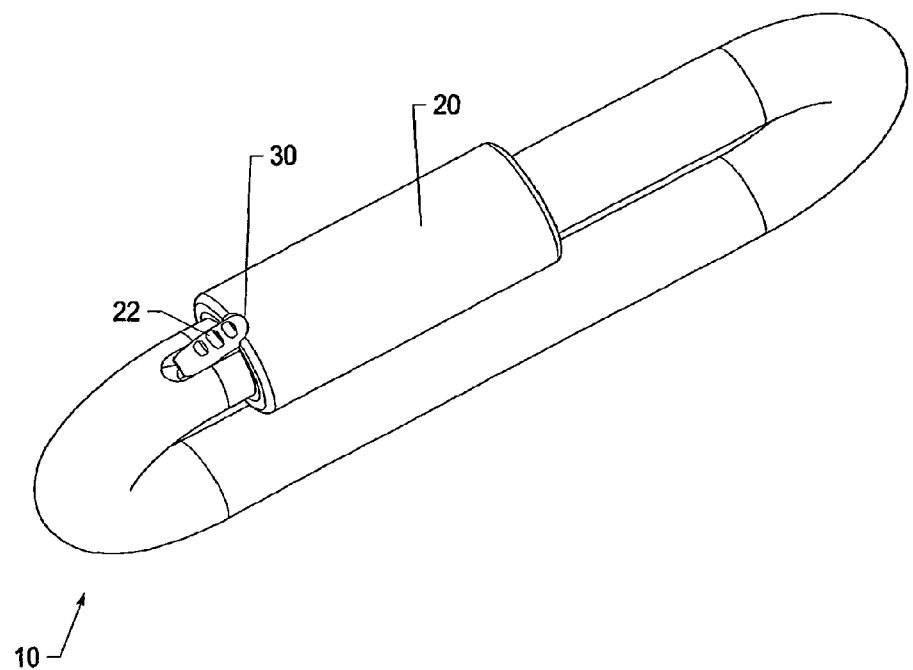
FIGS. 9 and 10 are identical views to FIGS. 7 and 8, in the locked state of the ferrule.
Figure 10:
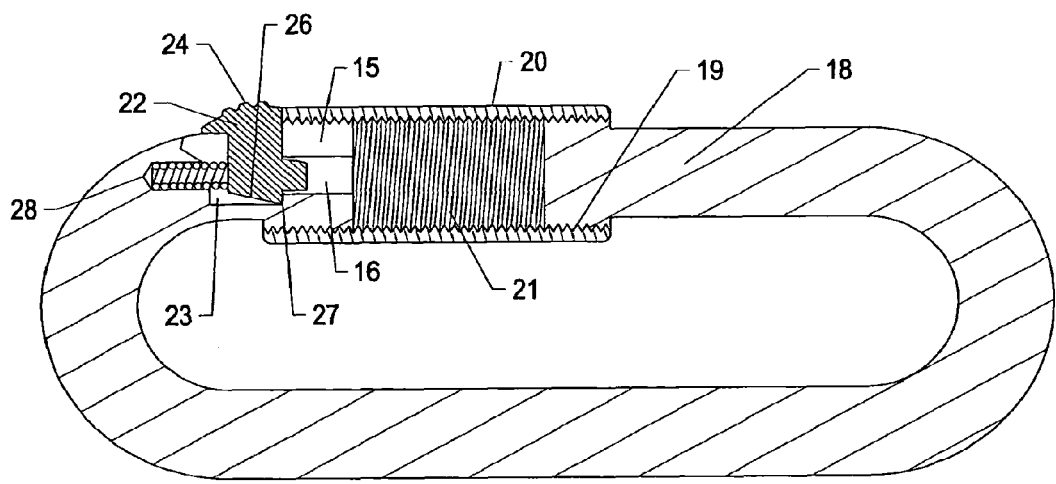

FIGS. 9 and 10 show the final locked position of ferrule 20 by lock 22 which penetrates into notch 30 at the end of screwing travel. Locking is automatic as soon as notch 30 reaches a position facing lock 22, which is pushed by spring 28. Shackle 10 is locked in the closed position, and any unscrewing of ferrule 20 is impossible with a manual action on lock 22.

Figure 11:
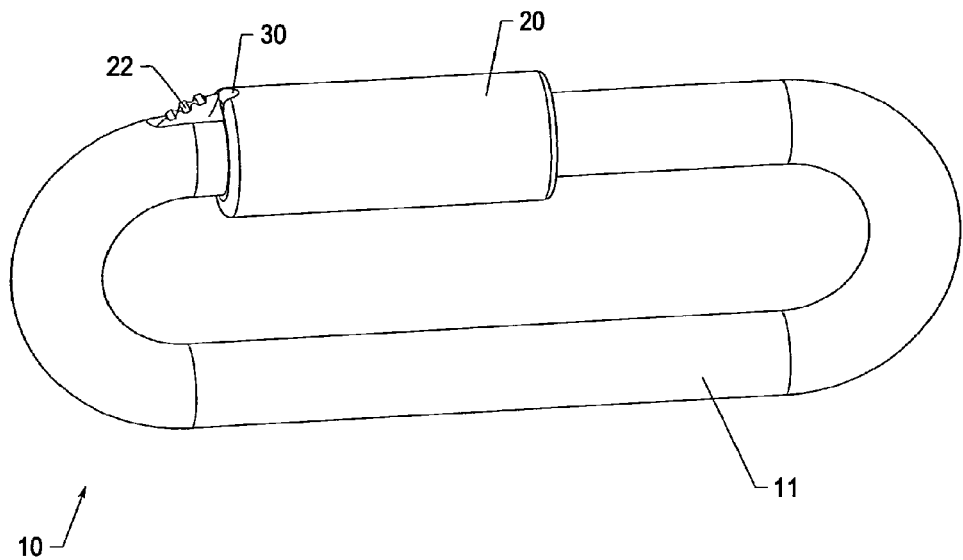
FIGS. 11 and 12 are identical views to FIGS. 9 and 10, after the lock has been released to unscrew the ferrule.
Figure 12:
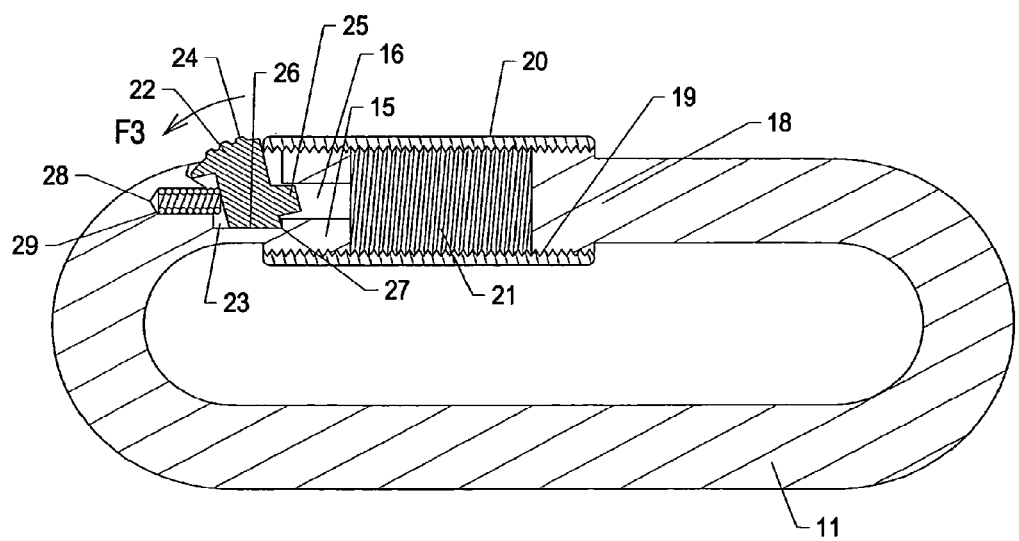

The unlocking phase is illustrated in FIGS. 11 and 12. To open shackle 10, lock 22 simply has to be moved to the unlocked position by making it pivot in the direction of arrow F3, against the return force of spring 28. Lock 22 moves out of notch 30 and releases ferrule 20 which can be unscrewed and moved to the open position of FIGS. 1 and 2.

It can be observed in FIG. 10 or 12 that the length of ferrule 20 corresponds substantially to the sum of the lengths of end-parts 15, 18 and of the distance separating the latter.

The invention claimed is:

1. An attachment shackle comprising:
   an open ring having threaded first and second end-parts arranged facing one another at opposite ends of the open ring, the first and second end parts defining a longitudinal space therebetween;
   a rotating ferrule fitted on the second end-part between a closed position and an open position to respectively close or open the space separating the two end-parts, said ferrule having a hollow tube with an inner threaded surface extending over a whole length of the ferrule:
   a spring;
   a lock housed in a recess of the ring at a rear of the threaded first end-part, the lock being biased to a locked position by the spring; and
   a notch located at a peripheral end of the ferrule so that the lock engages automatically said notch when the ferrule is in the closed position, unlocking being performed by a manual releasing action of the lock allowing the rotary ferrule to be unscrewed to the open position.

2. Attachment shackle according to claim 1, wherein the lock comprises a base part in the form of a wedge enabling a pivoting movement to an unlocked position.

3. Attachment shackle according to claim 2, wherein the lock is provided with a gripping button and with a pin designed to engage in a bore of the first end-part.

4. Attachment shackle according to claim 3, wherein the spring is coaxially aligned with the bore and with the pin.

5. Attachment shackle according to claim 2, wherein the base part of the lock presses on a rim of the first end-part.

6. Attachment shackle according to claim 1, wherein the notch extends at the peripheral end of the ferrule and presents a slightly larger width than that of the lock.

7. Attachment shackle according to claim 1, wherein the length of the ferrule corresponds to the sum of the lengths of end-parts and of a distance of said space.

* * * * *